(No Model.)
D. P. THOMSON & A. H. ARMSTRONG.
ARMATURE FOR DYNAMO ELECTRIC MACHINES.
No. 565,647. Patented Aug. 11, 1896.
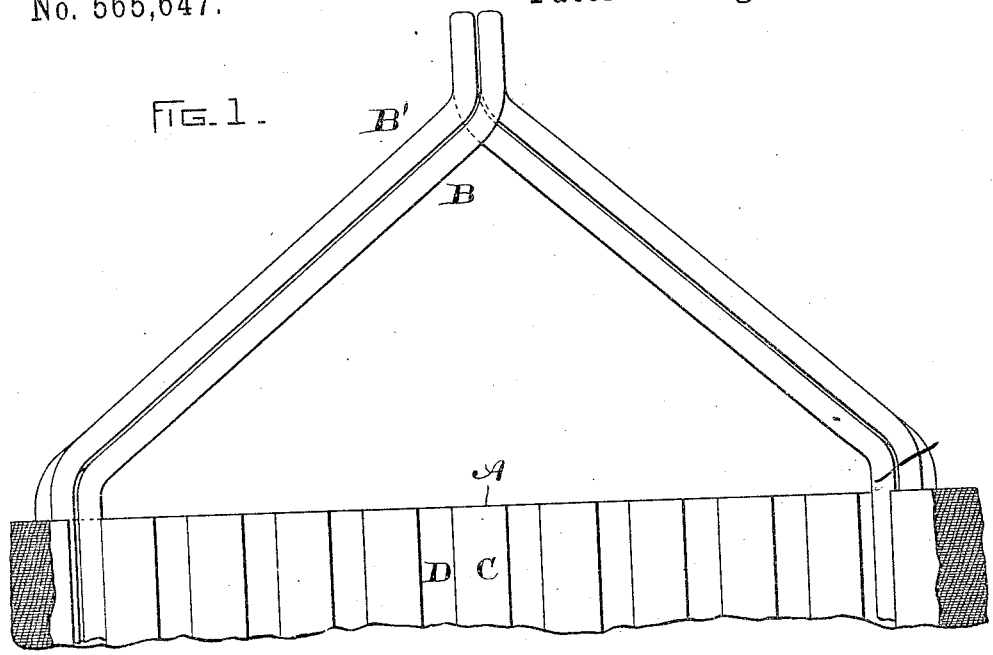
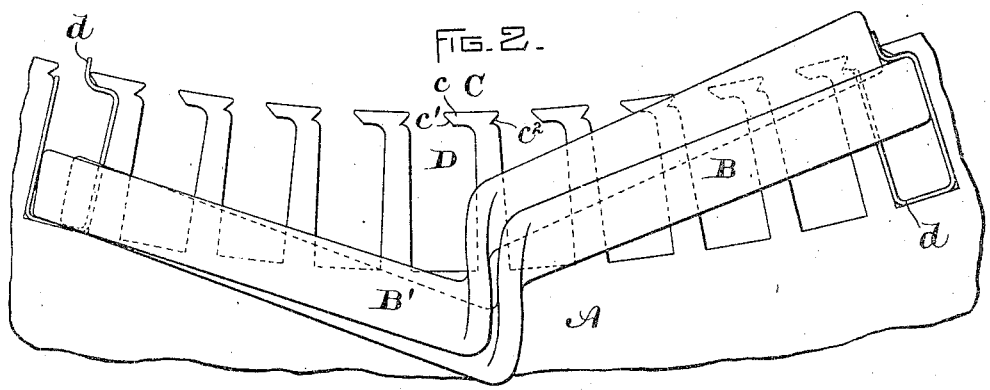
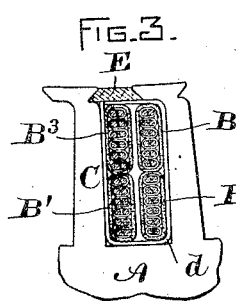
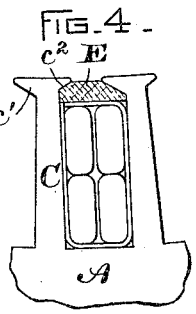
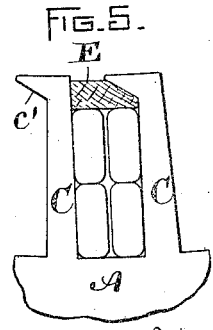

United States Patent Office.

DAVID P. THOMSON AND ALBERT H. ARMSTRONG, OF SCHENECTADY, NEW YORK, ASSIGNORS TO THE GENERAL ELECTRIC COMPANY, OF NEW YORK.

ARMATURE FOR DYNAMO-ELECTRIC MACHINES.

SPECIFICATION forming part of Letters Patent No. 565,647, dated August 11, 1896.

Application filed May 13, 1896. Serial No. 591,384. (No model.)

*To all whom it may concern:*

Be it known that we, DAVID P. THOMSON and ALBERT H. ARMSTRONG, citizens of the United States, residing at Schenectady, in the county of Schenectady, State of New York, have invented certain new and useful Improvements in Dynamo-Electric Machines, (Case No. 379,) of which the following is a specification.

Our invention relates to dynamo-electric machines, and has for its object to provide a convenient way of mounting the coils upon the cores in such structures, and in particular upon their armatures. It may well be applied to field-magnets where such a construction as the one indicated would be suitable, and has particular utility in modern types of alternating-current apparatus.

In general our invention consists in a core provided with slots in which coils are to be inserted, and having teeth of a peculiar shape. The teeth overlap a part of the slot with an L-shaped projection. The under side of the L-shaped projection is undercut, and the rear portion of the L has a small notch, also undercut, so that a wedge may be driven over the coils to retain them in place. The opening in the slot is approximately one-half of the entire slot width, and the coils are dropped into it in such a way that the insulation of the coil is not disturbed. The slot may also be lined with insulation, which is not abraded in the process of inserting the coils, and after these latter are put in place a wedge is driven in, so that they are firmly retained, preserving their position against centrifugal strains, if the construction be used in a revolving armature, and against magnetic stress.

The accompanying drawings show our device, Figure 1 being a plan of a stationary armature; Fig. 2, a side elevation of the part shown in Fig. 1, and Figs. 3, 4, and 5 detail views of modifications.

In Fig. 1, A is the core. B B' are the coils. C C are the teeth, and D are the slots or openings between them. The shape of the teeth is best seen in Fig. 2. Each tooth C has a projecting portion $c$, (shown on the left in the figure,) having an undercut side $c'$, and upon the back of the L-shaped tooth is a similar surface $c^2$. The operation of inserting the coils is also best seen in this figure. The coil B is first inserted and is then moved to the right, occupying the lower right-hand portion of the slots. The next coil B' is then inserted and occupies the left-hand portion of each slot, each coil of course spanning as many teeth as may be desired, either the polar pitch of the machine or such portion thereof as the designer may arrange.

In Fig. 3 a section is shown with all four of the coils which would ordinarily be used in place. On the left in Fig. 2 and in Fig. 3 at $d$ is shown a sheet of insulation applied to the interior of the slot, and at E is shown the wedge, preferably of wood, which is driven in over this insulation. It will be seen that the wedge does not come in contact with the coil, so that its insulation is never impaired. The upper two coils $B^2$ and $B^3$ in Fig. 3 are inserted in the same way as those shown in Fig. 2. It will be observed that they occupy a trifle less than half the width of the slots. In practice the slight inequalities of coils and the thickness of the surrounding sheet of insulation will be sufficient to make them fit closely, but without any tendency to abrade the insulation in insertion.

In Fig. 4 we show a modified form of the tooth C, the other parts being as shown in the preceding figures. In this case the undercut portion $c'$ of the tooth forms the entire overhang on the left side, and similarly the undercut portion $c^2$ forms the entire overhang upon the right.

In Fig. 5 a further modification is shown, although this is not the preferred form, in which one side of the tooth is straight and the base of the L forms the overhang upon the other side.

By forming each of the coils in such a way as to occupy substantially an aliquot part of the slot we are enabled to contract the opening and yet insert the coil without abrasion, the coils being simply dropped into the slot and then adjusted in position, the wedges E E afterward compressing them sufficiently to make a firm engagement. In other forms of construction with which we are familiar this result has been obtained by separating the wires of the coil and inserting them one at a time through the slot and afterward arranging them in place. This, however, has the great disadvantage of rendering uncertain the insulation of the coil as a whole. In still another form with which we are familiar the coil is compressed as it passes through the slot, thus rendering abrasion of the insulation liable to occur; while in still another form the coil is divided, but is made smaller than the portion of the slot through which it enters, and the coils are then separated by wedges previously placed in the slot, the construction being troublesome to put in place and insecure after it is arranged.

An added feature of usefulness in our invention lies in the fact that the slots have sides parallel with the radius passing through their centers, so that the sides of the coils may be substantially straight, and yet they will occupy, as above pointed out, an aliquot portion of the cross-section of the slot.

It is manifest that our invention is not limited to the use of four coils in each slot, as other numbers, more or less, could be used by simply altering the size of the coils.

What we claim as new, and desire to secure by Letters Patent of the United States, is—

1. An armature for a dynamo-electric machine, comprising a core having slots the sides of which are parallel with the radii passing through their centers, L-shaped teeth having undercut portions, coils each occupying an aliquot portion of the slot, and wedges engaging with the undercut portion of the teeth for retaining the coils in place.

2. An armature for a dynamo-electric machine, comprising a slotted core, the sides of the slots being parallel to the radii passing through their centers, separately wound and insulated coils the working portions of which occupy aliquot parts of different slots, L-shaped teeth between the slots, the teeth having undercut portions upon the base and back of the L, and wedges engaging with the undercut portions for holding the coils in place.

In witness whereof we have hereunto set our hands this 8th day of May, 1896.

DAVID P. THOMSON.
ALBERT H. ARMSTRONG.

Witnesses:
B. B. HULL,
E. W. CADY.